US012559031B2

(12) United States Patent
Olson

(10) Patent No.: US 12,559,031 B2
(45) Date of Patent: Feb. 24, 2026

(54) UTV SIDE MIRROR MOUNTING AND ADJUSTMENT SYSTEM

(71) Applicant: CHUPACABRA LLC, Peoria, AZ (US)

(72) Inventor: Nicholas Olson, Peoria, AZ (US)

(73) Assignee: CHUPACABRA LLC, Peoria, AZ (US)

( * ) Notice: Subject to any disclaimer, the term of this patent is extended or adjusted under 35 U.S.C. 154(b) by 346 days.

(21) Appl. No.: 18/369,783

(22) Filed: Sep. 18, 2023

(65) Prior Publication Data

US 2024/0092266 A1 Mar. 21, 2024

Related U.S. Application Data

(60) Provisional application No. 63/407,576, filed on Sep. 16, 2022.

(51) Int. Cl.
| | |
|---|---|
| *B60R 1/078* | (2006.01) |
| *B60R 1/02* | (2006.01) |
| *B60R 1/06* | (2006.01) |
| *G02B 7/182* | (2021.01) |

(52) U.S. Cl.
CPC ................ *B60R 1/078* (2013.01); *B60R 1/02* (2013.01); *B60R 1/06* (2013.01); *B60R 1/0605* (2013.01); *B60R 1/0617* (2013.01); *G02B 7/182* (2013.01); *G02B 7/1822* (2013.01); *G02B 7/1824* (2013.01); *G02B 7/1825* (2013.01)

(58) Field of Classification Search
CPC .. B60R 1/006; B60R 1/02; B60R 1/06; B60R 1/0605; B60R 1/0617; G02B 7/182; G02B 7/1822; G02B 7/1824; G02B 7/1825
See application file for complete search history.

(56) References Cited

U.S. PATENT DOCUMENTS

| | | | | |
|---|---|---|---|---|
| 2017/0334343 A1* | 11/2017 | Kastanis | ................... | B60R 1/06 |
| 2019/0126828 A1* | 5/2019 | Chen | ......................... | B60R 1/06 |
| 2019/0339484 A1* | 11/2019 | Lake | ...................... | G02B 7/198 |
| 2020/0237078 A1* | 7/2020 | Walton | ................... | G02B 7/182 |
| 2021/0001780 A1* | 1/2021 | Hancock | ................ | B60R 11/00 |
| 2023/0251459 A1* | 8/2023 | Hagene | ................. | G02B 7/182 |
| | | | | 359/842 |

* cited by examiner

*Primary Examiner* — Nathanael R Briggs
(74) *Attorney, Agent, or Firm* — Bycer & Marion, PLC; Matthew L. Bycer

(57) ABSTRACT

A UTV side mirror mounting, and adjustment system may be coupled to the sidebar of a UTV chassis. The UTV side mirror mounting, and adjustment system may include a module, multi-component clamp system coupled to the neck of a rotatable ball and socket joint, with the distal end of the rotatable joint being coupled to a hinge. The hinge may be secured to the side mirror, or other peripheral in need of mounting. The modular, multi-component clamp system, rotatable ball and socket joint, and hinge can each be independently adjusted, and secured to modulate and secure the peripheral's position in relation to the chassis sidebar. The modular, multi-component clamp system may secure the UTV side mirror mounting and adjustment system to an adjustable multi-component clamp system, the adjustable multi-component clamp system being coupled to a UTV or other chassis sidebar. The adjustable multi-component clamp system may couple to the sidebar of a UTV chassis via the modular, multi-component clamp system.

19 Claims, 7 Drawing Sheets

UTV SIDE MIRROR MOUNTING AND ADJUSTMENT SYSTEM

CLAIM OF PRIORITY

The present application includes subject matter disclosed in and claims priority to a provisional application entitled "Vehicle Mounting Systems" filed Sep. 16, 2022 and assigned Ser. No. 63/407,576, describing an invention made by the present inventor, herein incorporated by reference.

BACKGROUND OF THE INVENTION

1. Field of the Invention

The present invention relates to a vehicle peripheral mounting system for mounting a peripheral in various configurations along an open-topped or off-roading vehicle chassis, frame, cabin, or roll cage. More specifically, the present invention relates to a mounting system designed with structural elements that allow a peripheral, such as a side mirror, to be adjusted, and secured, in numerous directions and orientations.

2. Description of Related Prior Art

Utility Task Vehicle (UTV) side mirrors function to enhance UTV function and safety by providing drivers with a clear view of the UTV's side and rear surroundings. UTV side mirrors facilitate drivers in navigating diverse terrains and avoiding obstacles. UTV side mirrors are typically mounted on the sidebar of the vehicle's frame, chassis, cabin, or roll cage. Their design prioritizes durability, as they are engineered to withstand the rigors of off-road use, including but not limited to, vehicle vibrations, impact with debris, and harsh weather conditions.

It is preferable that the UTV side mirror be adjustable, thereby allowing drivers to customize the mirror's orientation, ensuring an optimal view. Mirrors that offer numerous adjustment options are often unstable, moving during driving, particularly during off-roading.

UTV side mirror systems presently known in the art may interfere with windshields and window nets. Furthermore, presently available side mirror systems offer a limited range of configuration options, and many are not compatible with other roll cage accessories. Therefore, there is a great need for durable UTV peripheral mounting systems that offer three hundred sixty degrees of rotation and a broad range of configurations in the latitudinal, longitudinal, and diagonal directions, while also remaining fixed in place once the vehicle is in use. Additionally, there is a need for side-view mirrors with a wide field of view and compatibility with extra attachments such as light mounts and anti-vibration mechanisms.

It is therefore a primary object of the present invention to provide an adjustable peripheral.

It is a further object of the present invention to provide a method for attaching, adjusting and/or using a peripheral mounted on a vehicle.

These and other objects of the present invention will become apparent to those skilled in the art as the description thereof proceeds.

SUMMARY OF THE INVENTION

The present invention is directed to a lockable peripheral mounting and adjustment system for use on a chassis sidebar. In some embodiments, the peripheral may be a side-view mirror. The lockable peripheral mounting and adjustment system may include an adjustable multi-component clamp system.

The multi-component clamp system may be fashioned from a hollow partial tubular body adapted to surround and/or circumscribe the chassis sidebar. The chassis sidebar may be rounded or edged. The hollow partial tubular body may have opposing ends and an adjustable diameter. The hollow partial tubular body may couple to a wedged body, such that the partial tubular body and wedged body merge to fully encircle, or circumscribe, a portion of the chassis sidebar. The hollow partial tubular body may couple to the wedged body with one or more bolts, and the wedged body may couple to a rotatable joint via a ball, such that the ball is inserted within a hollow socket of a chamber in the rotatable joint. The rotatable joint may be a ball-and-socket joint, and a spheroid may serve as a ball for the ball-and-socket joint.

The wedged body may be fixed to a trapezoidal prism, such that the trapezoidal prism fixes the wedged body to a neck, such that the neck couples the trapezoidal prism to the spheroid. The wedged body may rotate along the ball, or spheroid, of the rotatable ball-and-socket joint, independent of the peripheral.

The socket may be constructed from a multi-part chamber, with the multi-part chamber compressing the spheroid to lock a relative position of the spheroid into a set position. The multi-part chamber may include a chamber top and a chamber bottom, with the chamber top and chamber bottom each partially encircling the spheroid, such that the chamber top and chamber bottom join to one another to fully encircle the spheroid. In some embodiments, the rotatable ball-and-socket joint may include at least one chamber screw set through one or more apertures in the chamber, providing optional compression of said chamber around said spheroid. Apertures may be set within the chamber top and chamber bottom such that a screw or plurality of screws may pass through the apertures to fix, and optionally tighten, the chamber top to chamber bottom, such that the chamber top and chamber bottom squeeze the spheroid, applying friction to the spheroid to lock the spheroid into a position.

A top plate and a bottom plate may be coupled to a distal end of the rotatable joint, with the top plate coupled to a top of a revolute joint and the bottom plate coupled to a bottom of the revolute joint. The coupled plates may couple to the revolute joint to allow one degree of rotation between the revolute joint and said plates. The revolute joint may include a hinge pin inserted within a rotary bearing such that the rotary bearing is fixedly coupled with the peripheral and the rotary bearing rotates around the hinge pin along a longitudinal axis of the hinge pin. The hinge pin may be a threaded cylindrical body, such that screwing the hinge pint into the rotary bearing locks a relative position of the peripheral relative to said ball-and-socket joint. In an optional, alternative embodiment, the hinge pin may be an alternative extended accessory mounting screw that may replace the hinge pin. In such embodiments, the extended accessory mounting screw may have a distal end that extends beyond a plate of the pair of plates. The extended accessory mounting screw may support an accessory mounted thereon, such that the extended accessory mounting screw couples the accessory to the lockable peripheral mounting and adjustment system. In some embodiments, the accessory may be a light fixture.

A peripheral may be coupled to a distal end of the top plate and bottom plate, such that when the plates rotate, the peripheral rotates accordingly. The adjustable multi-component clamp system, rotatable joint, and pivotable hinge may each include a bolted locking mechanism.

The invention may be fixed to a sidebar by fixing the multi-component clamp system to the chassis sidebar by first coupling a hollow partial tubular body around at least a majority of the chassis sidebar. Then, a wedged body may be rotated until the wedged body properly fits around the chassis sidebar and any accessories optionally coupled to the chassis sidebar. Then one or more chamber screws may be loosened to provide movement in the ball-and-socket joint, after which the ball-and-socket joint may be rotated until the peripheral is satisfactorily positioned.

To fix the rotatable joint in position, a single or plurality of chamber screws may be tightened until the rotatable joint is fixed in position. After which, the peripheral may be further adjusted along the longitudinal axis of a revolute joint by loosening a hinge pin such that a rotary bearing may pivot around a longitudinal axis of the hinge pin. The rotary bearing may pivot around the hinge pin until the peripheral is properly positioned, at which point the hinge pin may be tightened to secure the peripheral into a fixed position. In some embodiments, the hinge pin may be replaced with an extended accessory supporting screw. An accessory may be coupled to the accessory supporting screw.

BRIEF DESCRIPTION OF THE DRAWINGS

The present invention will be described with greater specificity and clarity with reference to the following drawings, in which.

DETAILED DESCRIPTION OF THE PREFERRED EMBODIMENTS

Disclosed is a lockable and adjustable peripheral mounting system (herein referred to as peripheral mounting system), suitable for coupling a peripheral to the sidebar of a chassis, frame, bar, roll cage, or other such similar structure including but not limited to those structures associated with open-topped vehicles, off-roading vehicles, racing vehicles, buggies, Utility Task Vehicles (UTVs), and All Terrain Vehicles (ATVs). In a preferred embodiment, the disclosed peripheral mounting system couples a side mirror with a sidebar on a vehicle's chassis, frame, sidebar, or roll cage. In alternative embodiments, the peripheral mounting system may couple other accessories to a suitably shaped bar or chassis. In a preferred embodiment, the peripheral mounting system includes a modular, multi-component clamp system coupled to the neck of a rotatable ball and socket joint, with the distal end of the rotatable joint being coupled to a hinge. The hinge may be secured to the peripheral in need of mounting, such that the modular, multi-component clamp system, rotatable ball, and socket joint, and hinge can each be independently adjusted, and secured to modulate and secure the peripheral's position in relation to the chassis sidebar.

General Structure

Figure 1:
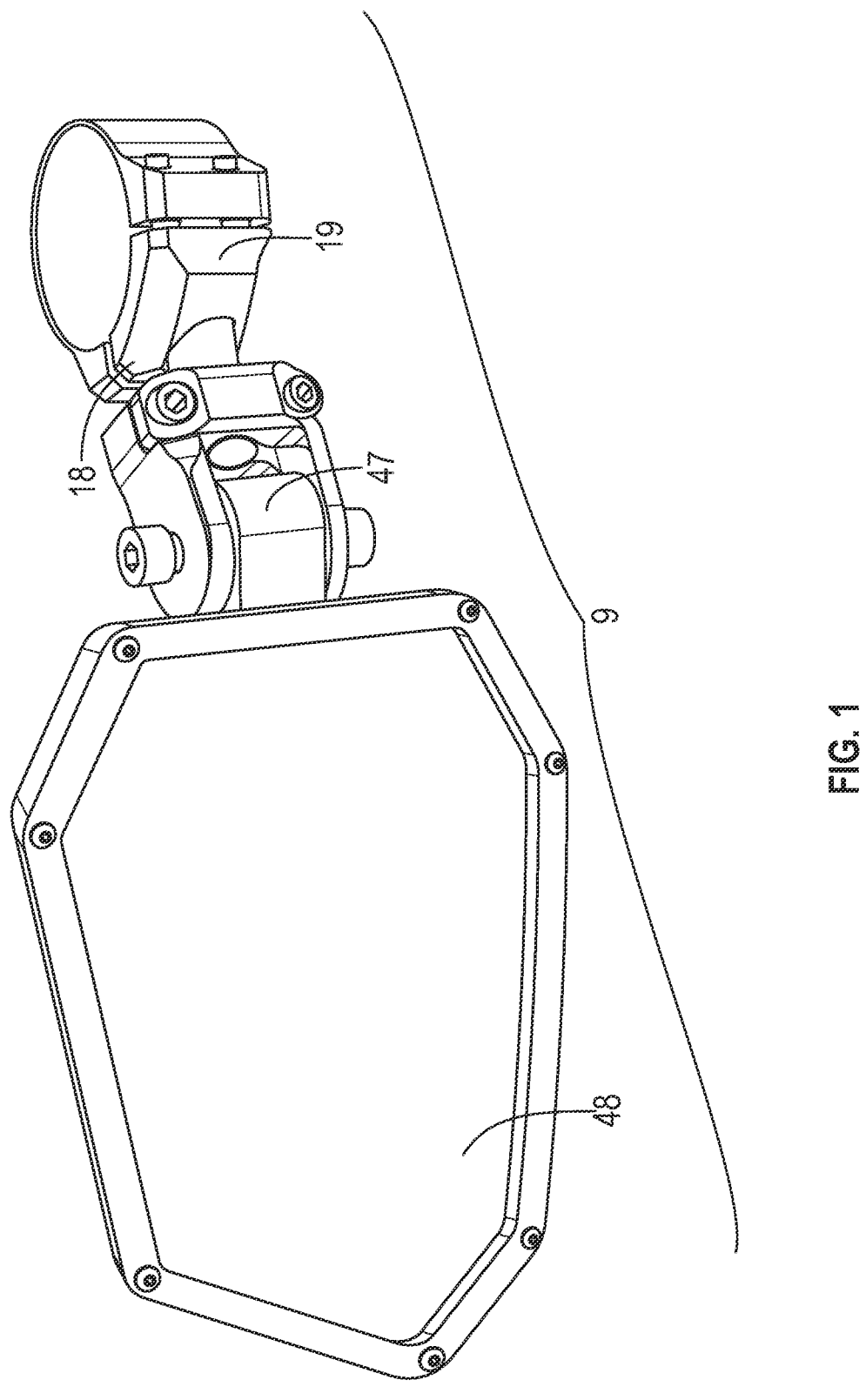
FIG. 1 is a view of the lockable peripheral mounting and adjustment system.
Figure 4:
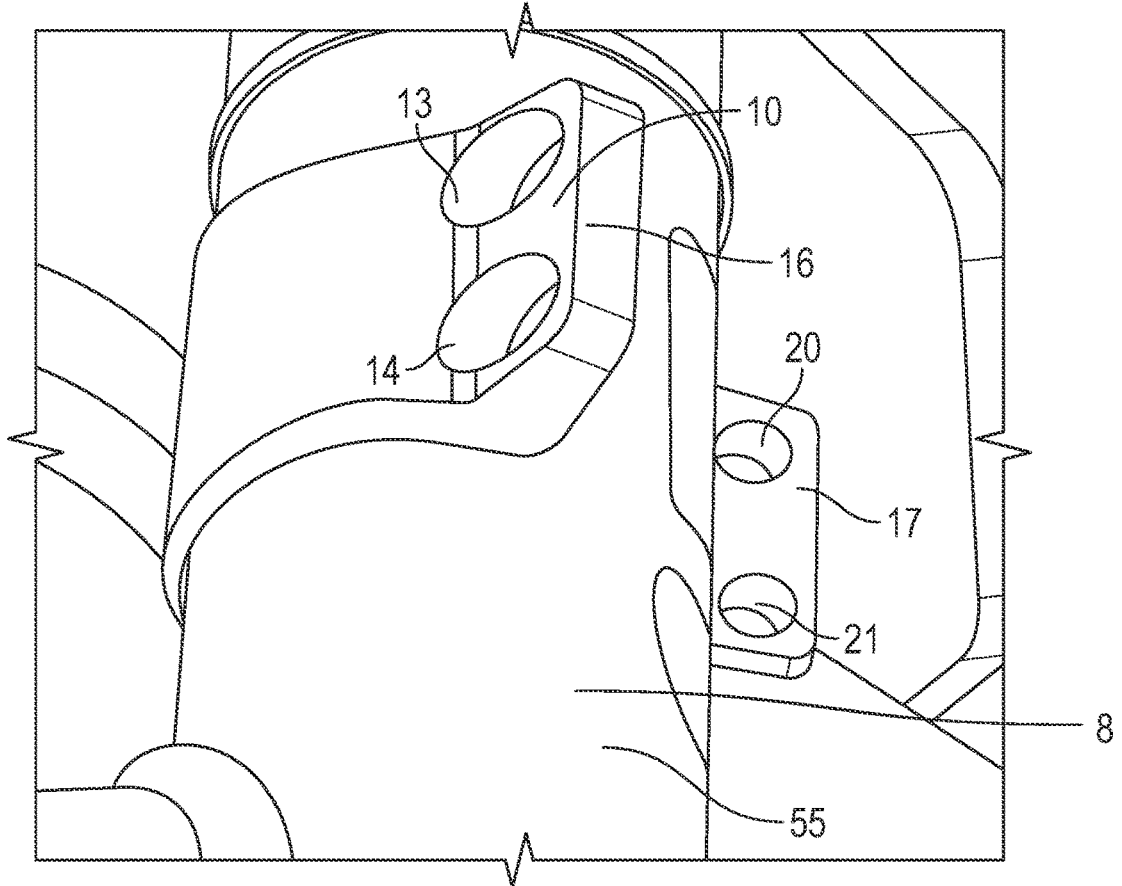
FIG. 4 is a view of the partially tubular body encircling the chassis sidebar.

As seen in FIG. 1 and FIG. 4, lockable peripheral mounting and adjustment system 9, herein referred to as "peripheral mounting system" may be attached to chassis sidebar 8 via modular clamp system 10. chXassis sidebar 8 may be a structural or decorative component of a vehicle. In a preferred embodiment, chassis sidebar 8 may run along the side of a vehicle in an upright, or diagonal direction, such that chassis sidebar 8 may intersect the top of a frame. It is preferable chassis sidebar 8 be constructed from a sturdy, rigid material, such as but not limited to steel or aluminum, such that chassis sidebar 8 be sturdy enough to support peripherals such as side-view mirrors, and other auxiliary equipment.

Figure 2:
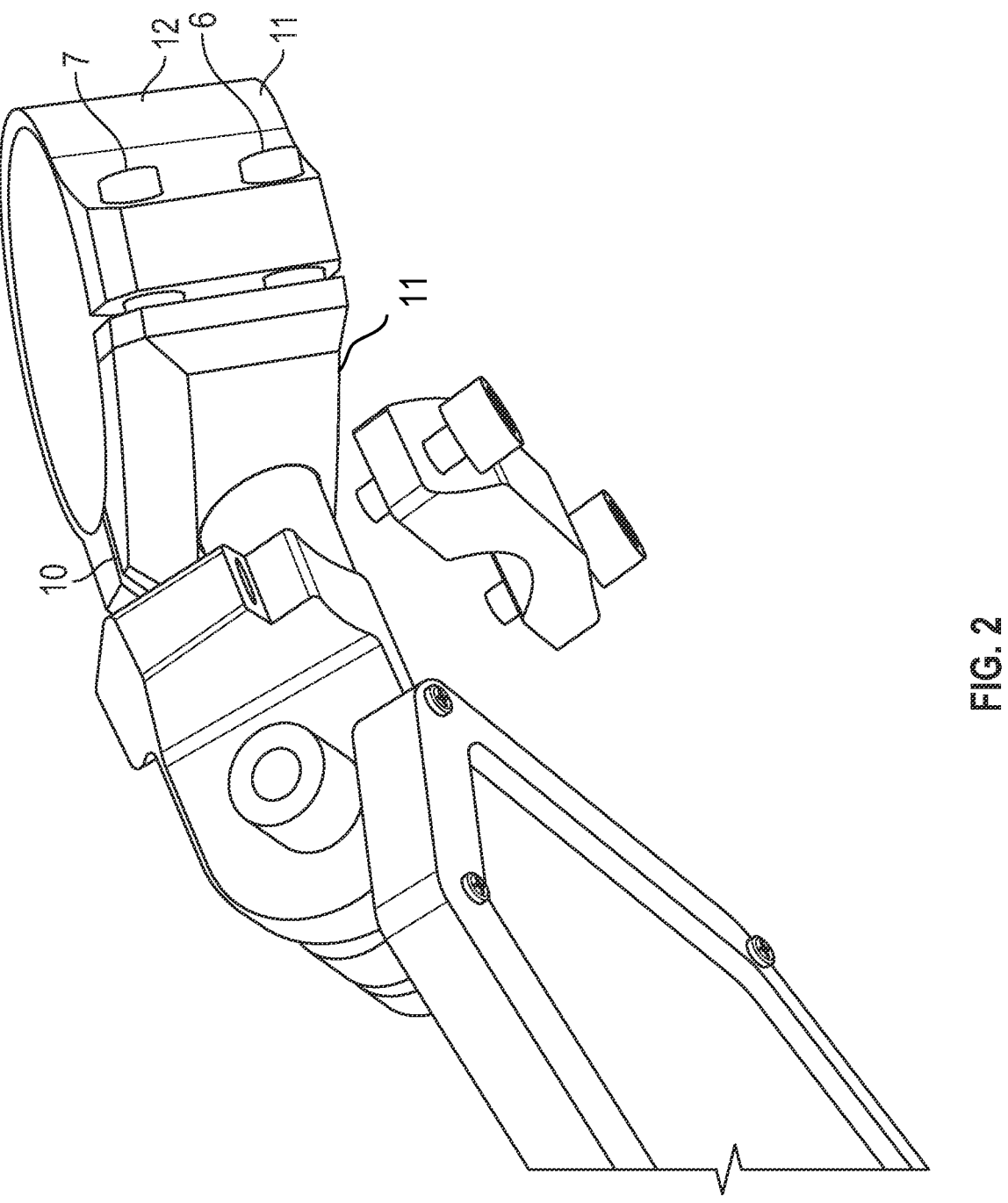
FIG. 2 is a view of the multi-component clamp system.
Figure 3:
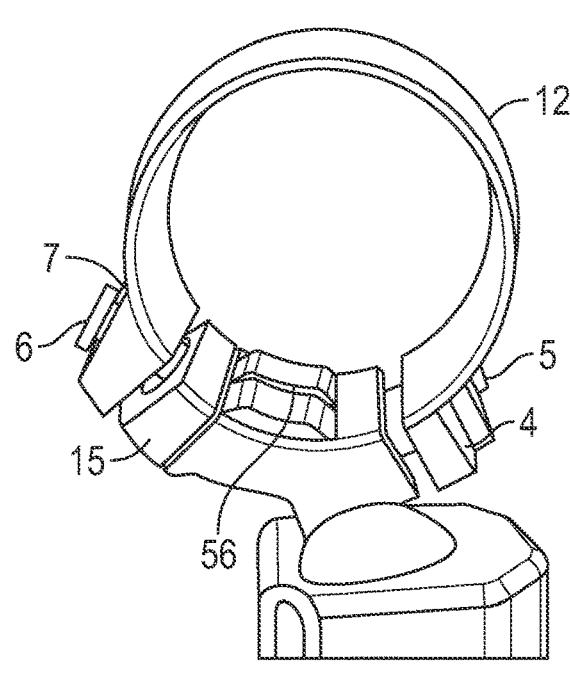
FIG. 3 is a side view of the multi-component clamp system.

As seen in FIG. 2 and FIG. 3. Modular clamp system 10 may include but is not limited to, multi-component clamp 11, which includes partial tubular body 12 and wedged body 15, clamp back bottom bolt 6, clamp back top bolt 7, section two bottom bolt 4, clamp front bottom bolt 5, and clamp front top bolt 6 with the aforementioned bolts securing modular clamp system 10.

Modular clamp system 10 is a preferred system for clamping peripherals onto chassis sidebar 8, due to modular clamp system's 10 sturdiness, versatility, and adaptability. In some embodiments modular clamp system, 10 may include a multi-component clamp 11. It is preferable that multi-component clamp 11 be constructed from partial tubular body 12, which may encircle approximately three-quarters of a chassis 8, and from wedged body 15, which integrates with partial tubular body 12, to fully encircle chassis sidebar 8. It is preferable that partial tubular body 12 have a low profile, with thickened flared ends, partial tubular body first flared end 16, and partial tubular body second flared end 17 that coordinate with wedged body first end 18 and wedged body second end 19, such that partial tubular body 12 and wedged body may couple to one another at their respective ends. It is preferable that multi-component clamp 11 be constructed from a material rigid enough to support the weight of a peripheral coupled to modular clamp system 10 and any other accessories that may be added to modular clamp system 10 while being flexible enough to widen around chassis sidebar 8 upon being snapped around chassis 8.

While clamp system 10 may be, but is not necessarily, rounded in shape, it may be compatible with chassis sidebars 8 of various shapes, as the interior of clamp system 10 may grip to a variety of differently shaped chassis sidebars 8. In an alternative embodiment, the interior of clamp system 10 may be coated with a soft, cushion-like material (not shown), facilitating numerous points of contact between clamp system 10, and chassis 8. In some embodiments, modular clamp system 10 may also be tightened or loosened to fit a particular range of chassis 8 sizes (not shown).

In some embodiments, partial tubular body 12 may be compatible with numerous wedged bodies 15, such that each wedged body 15 may be coupled to a single or plurality of peripheral(s), thereby enabling a variety of peripherals to be coupled to first clamp section when partial tubular body 12 is fixed to a selected wedged body 15.

Modular clamp system 10, is also a preferable clamp system due to its flexibility, as modular clamp system's 10 position and location along chassis sidebar 8 are adjustable, enabling users to select any location along chassis 8 as a suitable location for modular clamp system 10, and therefore the peripheral.

As seen in FIG. 2 and FIG. 3, in a preferred embodiment, modular clamp system 10 may be fastened to chassis sidebar 8 with a four-bolt pinch clamp system, such that modular clamp system 10 securely and sturdily surrounds chassis sidebar 8. As seen in FIG. 4, partial tubular body 12 may first be set upon chassis sidebar, such that, in some embodiments, approximately two hundred seventy degrees of chassis sidebar 8 is enveloped by partial tubular body 12, with partial tubular body second flared end 17 being set at two hundred seventy degrees from partial tubular body first flared end 16.

Subsequently, wedged body 15 may be set against partial tubular body 12, such that, as seen in FIG. 1, wedged body first end 18 is set against partial tubular body first flared end 16, and such that wedged body second end 19 is set against partial tubular body second flared end 17. In such embodiments, wedged body first end 18 may be set approximately two hundred seventy degrees from partial tubular body first flared end 16, and wedged body second end 19 may be set approximately three hundred sixty degrees from partial tubular body first flared end 16.

Figure 5:
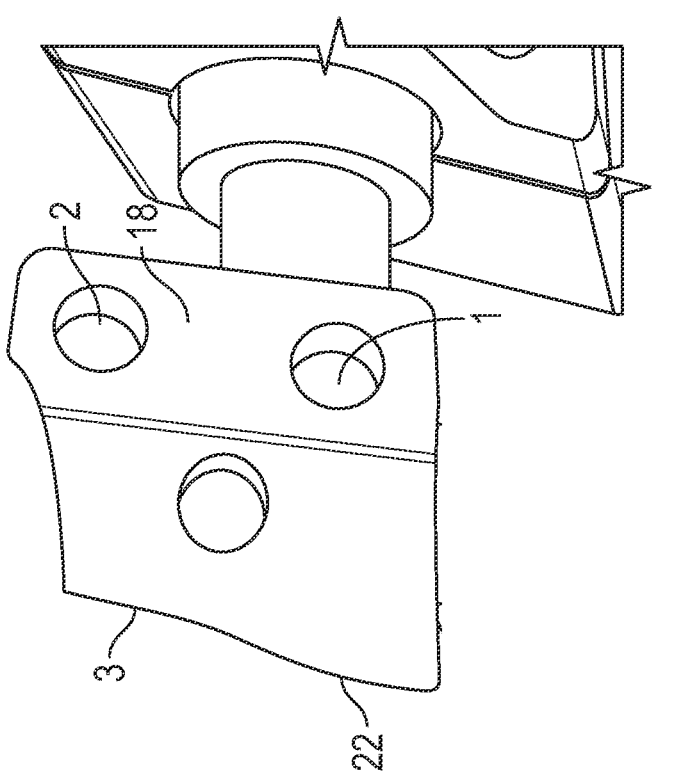
FIG. 5 is an internal view of the wedged body.

As seen in FIG. 3, to secure partial tubular body 12 to wedged body 15 it is preferable that bolts 4, 5, 6, and 7 pass through apertures 20 and apertures 21, to create a tight and stable connection between partial tubular body 12 and wedged body 15. In some embodiments, as seen in FIG. 4, partial tubular body first end rear aperture 13 and partial tubular body first end front aperture 14 may be set within partial tubular body first flared end 16, while partial tubular body second end rear aperture 20, and partial tubular body second end font aperture 21 may be set within partial tubular body second flared end 17. Similarly, as seen in FIG. 5, wedged body first end rear aperture 1 and wedged body first end front aperture 2 may be set within wedged body first end 18, and wedged body second end rear aperture 3 and wedged body second end front aperture 22 may be set within wedged body second end 19.

In some embodiments, as seen in FIG. 4 to secure partial tubular body 12 to wedged body 15, partial tubular body 12 may first be set upon chassis sidebar 8, such that approximately two hundred seventy degrees of chassis 8 is encircled by partial tubular body 12. Subsequently, wedged body 15 may be set along chassis 8, such that partial tubular body 12 and wedged body encircle chassis 8, preferably gripping onto chassis 8. To secure partial tubular body 12 to wedged body 15, as seen in FIG. 3, partial tubular body first end rear aperture 13 may be set against wedged body first end rear aperture 1, with clamp back top bolt 7 passing through both aperture 13 and aperture 1. Thereby securing partial tubular body 12 to wedged body 15, and tightly fastening modular clamp system 10 around chassis 8. To further ensure a secure connection between modular clamp system 10 and chassis 8, it is preferable that partial tubular body first end front aperture 14 be set against wedged body first end front aperture 2 with clamp back bottom bolt 6 passing through both aperture 14 and aperture 2. Additionally, partial tubular body second end rear aperture 20 may be set against partial tubular body second end rear aperture 3 with clamp front top bolt 5 passing through both aperture 20 and aperture 3, and partial tubular body second end font aperture 21 may be set against wedged body second end front aperture 22 with clamp front bottom bolt 4 passing through both aperture 21 and aperture 22. It is preferable that all clamp apertures be appropriately sized and shaped to securely fit clamp bolts therewithin.

Wedged body 15, may be asymmetrical, with neck 25 (further discussed below) coupling with, and intersecting wedged body 15 asymmetrically, such that when wedged body 15 is rotated neck 25, and therefore the peripheral is positioned in an alternative orientation relative to chassis sidebar 8. Such alternative orientations may be preferable to allow clearance for auxiliary equipment, including but not limited to windshields and window nets, and therefore it may be preferable to rotate wedged body 15 before securing wedged body 15 to partial tubular body 12. In such embodiments, wedged body 15 may be rotated approximately one hundred eighty degrees such that aperture 13 is set against aperture 2, with bolt 7 securing the two apertures to each other. In a preferred embodiment, wedged body 15 may be rotated a complete three hundred sixty degrees. The rotatable ball and socket joint, as disclosed below, may enable the rotation of wedged body 15, such that wedged body 15 may rotate while the peripheral remains stagnant.

In some alternative embodiments, when wedged body 15 is rotated, aperture 1 may be set against aperture 14, aperture 20 may be set against aperture 22, and aperture 21 may be set against aperture 3 with the remaining clamp bolts securing the aforementioned aperture pairs to each other. In a preferred embodiment, each aperture is similar in size and shape, and each clamp bolt is similar in size and shape such that the clamp bolts may be interchangeable among the clamp apertures.

It is preferable that clamp bolt 4, clamp bolt 5, clamp bolt 6, and clamp bolt 7, which form the aforementioned four-bolt clamp bolt system, be tightened evenly in a diagonal pattern to distribute pressure and ensure a balanced and secure connection between modular clamp system 10 and chassis 8. The use of four bolts is preferable as the four-bolt pattern increases system stability, increases resistance to movement, and decreases vibration. Still, a system formed from a minimum of one bolt is satisfactory and falls within the scope of the present invention. Additionally, because there is no maximum limit to the number of bolts that may be incorporated into modular clamp system 10, a structure formed of any number of bolts as may be reasonably applied/fit is suitable and falls within the scope of the present disclosure.

Figure 6:
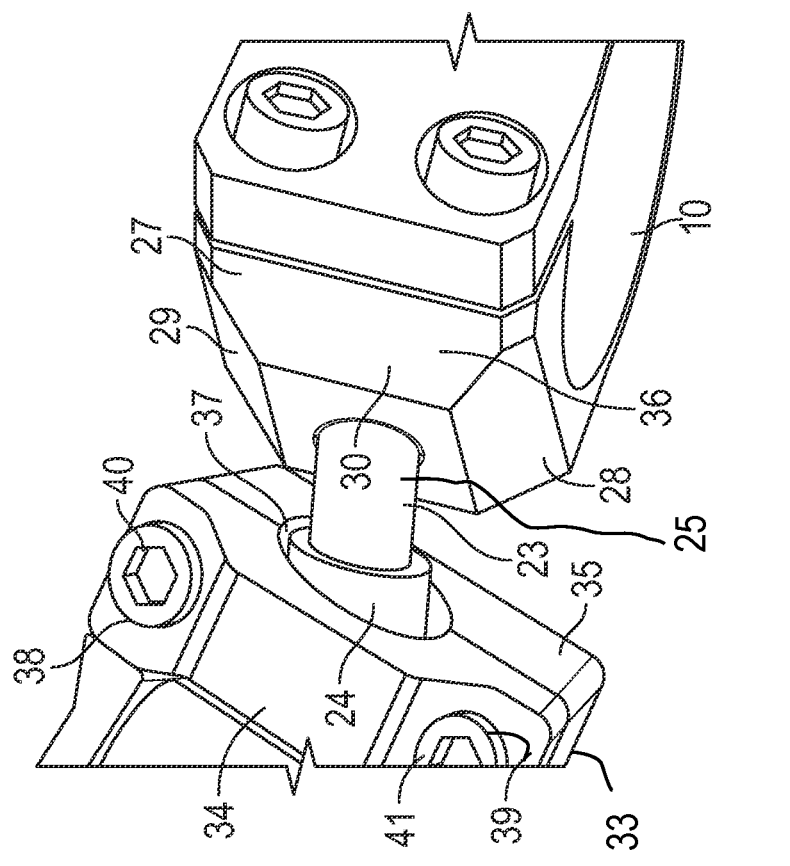
FIG. 6 is a view of the rotatable ball and socket joint.

In a preferred embodiment, as seen in FIG. 6, wedged body 15 may be coupled to an adjustable apparatus, such as but not limited to rotatable ball and socket joint 23. In a preferred embodiment, rotatable ball and socket joint 23 may enable the rotation of wedged body 15, additionally, rotatable ball and socket joint 23 may be manipulated into various positions, along any axis, while modular clamp system 10 remains firmly fixed to the chassis sidebar. In some embodiments, a peripheral may be coupled to the adjustable apparatus such that the peripheral's placement is adjusted when the adjustable apparatus is manipulated.

Modular clamp system 10 may either be permanently fixed to the adjustable apparatus, or, in an alternative embodiment, the adjustable apparatus may be removable such that various rotatable apparatuses coupled to various peripherals may be interchangeably fixed onto modular clamp system 10, and thereby coupled to chassis 8.

In some embodiments, as seen in FIG. 6, rotatable ball and socket joint 23 is a preferable adjustable apparatus, as such joints allow for three-dimensional rotational movement. In some embodiments, rotatable ball and socket joint 23 allows the peripheral to rotate one hundred eighty degrees. In other embodiments, rotatable ball and socket joint 23 may enable the peripheral to rotate up to three hundred sixty degrees.

In some embodiments, ball assembly 23, is formed from spheroid 24 affixed to neck 25, whereby neck 25 couples ball assembly 23 to modular clamp system 10. In the present disclosure, the term spheroid may refer to both a perfectly round sphere and to a spherical shape that is not perfectly round in any one or more of its dimensions, as both embodiments are suitable for rotatable ball and socket joint 23. As seen in FIG. 6, neck 25 may include rod-shaped component 26 and trapezoidal prism 27 such that rod-shaped component 26 terminates in trapezoidal prism 27. In a preferred embodiment, trapezoidal prism 27 may be directly coupled onto wedged body 15, either with glue, screws, or other such suitable adhesive mechanisms.

As seen in FIG. 6, trapezoidal prism 24 may feature six planar faces including large rectangular base 36, small rectangular base 37, and four lateral trapezoidal faces; front lateral trapezoidal face 28, back lateral trapezoidal face 29, left lateral trapezoidal face 30, right lateral trapezoidal face 31 (not shown). In some embodiments, large rectangular base 36 may be fixed to wedged body 15, while small rectangular base 37 may be coupled to rod-shaped component 26. In an alternative embodiment, small rectangular base 37 may be fixed to wedged body 15, while large rectangular base 36 may be coupled to rod-shaped component 26, thereby coupling rotatable ball and socket joint 23 to modular clamp system 10.

As seen in FIG. 6, the spheroid component of ball and socket joint 23, spheroid 24, may be set within socket 32, where socket 32 may be set within multi-part chamber 33 (herein referred to as chamber 33), with chamber 33 coupled to or otherwise set within a peripheral. Socket 32 may be a cavity, hole, or other such aperture within chamber 33, having restricted opening 37, wherein spheroid 24 passes through restricted opening 37 and occupies the void (not shown) within the cavity, hole, or aperture.

In a preferred embodiment chamber 33 may be a circular ring constructed from chamber top 34 and chamber bottom 35. Chamber 33 may be constructed such that spheroid 24 may be secured and immobilized within chamber 33. For example, in some embodiments, a plurality of apertures, such as chamber top right aperture 38, chamber top left aperture 39, chamber bottom right aperture (not shown), and chamber bottom left aperture (not shown) may be set within chamber top 34 and chamber bottom 35. In a preferred embodiment, spheroid 24 may be set between chamber top 34 and chamber bottom 35, after which chamber right screw 40 couples chamber top right aperture 38 to chamber bottom right aperture (not shown), and chamber left screw 41 couples chamber top left aperture 39 to chamber bottom left aperture (not shown), securing spheroid 24 within chamber 33.

In some embodiments, a compressive washer (not shown) may be set between chamber top 24 and chamber bottom 35 such that as the chamber right screw 40 and chamber left screw 41 are tightened, the compressive washers are compressed, increasing the force and friction between spheroid 24 and chamber 33.

To lock spheroid 24 into a desired position within chamber 33, chamber right screw 40 and chamber left screw 41 may be tightened such that chamber 33 narrows around spheroid 24, applying friction to spheroid 24 and preventing spheroid 24 for moving or otherwise shifting within socket 32. In such embodiments, the interior surface of chamber 33 may be constructed from, or alternatively coated, with a material that induces friction between chamber 33 and spheroid 24, including but not limited to a rough, uneven, coarse, or other such abrasive material.

Figure 7:
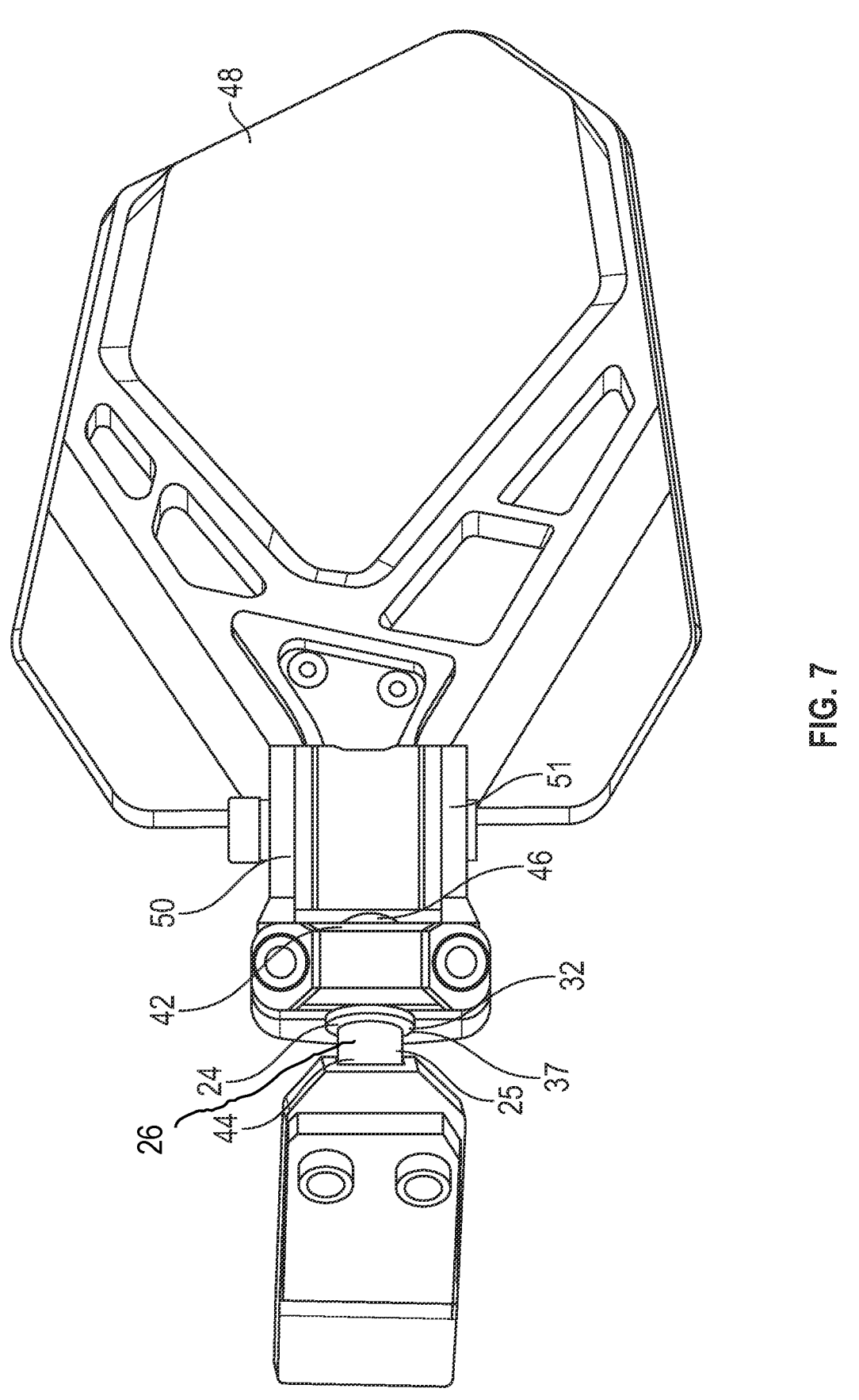
FIG. 7 is a view of the lockable peripheral mounting and adjustment system from the proximal end of the chassis.

As seen in FIG. 7, in some embodiments, it is preferable that spheroid 24 be inserted into socket 32 through chamber proximal face 44, such that spheroid end 46 passes through chamber 33, and protrudes through chamber distal face 42. In a preferred embodiment, inner space (not shown) of socket 33 is circular in shape, with a diameter that approximately equals the diameter of spheroid 24. In some embodiments, it is preferable that the diameter of restricted opening 37 be smaller than the diameter of inner space (not shown) of socket 32, and also smaller than the diameter of the spheroid 24, such that once spheroid 24 is inserted within socket 32, spheroid 24 is permanently set within socket 32.

In an alternative embodiment, to set spheroid 24 within socket 32, rotatable ball and socket joint 23 may include notched (not shown) ball 23 and round socket 32, which are joined together in a first joining orientation. Rotatable ball and socket joint 23 may operate in various orientations distinct from the first orientation. In the first joining orientation, the notched portion of ball assembly 23 may be aligned with restricted opening 37, such that the notched portion may be inserted into socket 32. The smaller effective cross-section of the notched portion of ball assembly 23 allows ball 23 to be inserted through opening 37. Once ball 23 is inserted into socket 32, ball assembly 23 may be rotated, such that spheroid 24 is fixed within socket 32. During operation, it is preferable that spheroid 24 be constrained such that ball assembly 23 may not enter an orientation wherein the notched portion will be aligned with restricted opening 37 in such a way that spheroid 24 may slide off socket 32.

In some embodiments, rotatable ball and socket joint 23 may include a set screw (not shown) such that the set screw is screwed into a dimple (not shown) in spheroid 24, further securing spheroid 24, such that spheroid 24 remained fixed when the chassis is mobilized.

In an alternative, preferred embodiment, ball 23 may be positioned within socket 32 by assembling socket 32 around ball 23. In such embodiments, socket 32 may be constructed from multi-part chamber 33, with multi-part chamber 33 being formed by the coupling of chamber top 34 with chamber bottom 35. It is preferable that the exterior of chamber top 34 and chamber bottom 35 be rectangular or square in shape, but any alternative shape is suitable and falls within the scope of the present invention. Chamber top 34 and chamber bottom 35 are preferably identical in size and shape, such that chamber top 34 and chamber bottom 33 may be fastened to each other to form chamber 33. As seen in FIG. 7, in a preferred embodiment, chamber 33 may have apertures (not shown) in both proximal face 44 and distal face 42, such that spheroid end 46 rests within the aperture (not shown) in distal face 42, and such that neck 25 rests near the aperture (not shown) in proximal face 44. It is preferable that the interior of chamber top 34 and chamber bottom 33 be hollowed out into hemispheroids such that when chamber 33 is constructed, and the chamber top 34 interior is set against chamber bottom 33 interior, the two hemispheroids are joined to form socket 32 and restricted opening 37. It is preferable that each hemispheroid be constructed such that when the two hemispheroids (not shown) are joined, the resulting spheroid, or alternatively elliptical spheroid has a similar diameter, on the non-elongated axis (not shown), to the diameter of spheroid 24. Additionally, in some embodiments, it is preferable that the elongated end (not shown) have a minor axis measuring less than the diameter of spheroid 24, such that the elongated end may form restricted opening 37. In other, preferable embodiments, the interior of chamber top 34 and chamber bottom 33 may be hollowed out into spherical segments, rather than hemispheroids, such that the two spherical segments join together to form a spherical segment having a similar diameter to that of spheroid 24, such that spheroid 24 may be set between chamber top 34 and chamber bottom 33.

As seen in FIG. 7, to assemble chamber top 34 and chamber bottom 33 into chamber 33 it is preferable that ball assembly 23 first be set within either chamber top 34 or chamber 33, with neck 25 remaining outside of the chamber, after which the alternate chamber may be placed around the remaining surface of ball assembly 23, such that the majority of ball assembly 23 is enveloped by chamber 33, with a portion of ball 23 and neck 25 remaining outside of chamber 33. In a preferred embodiment, ball assembly 23 may pass through chamber 33 proximal face 44, such that spheroid end 46 is either set by chamber 33 distal face 42 or in an alternative embodiment, such that spheroid end passes through chamber 33 distal face 42.

In some alternative embodiments, chamber top 34 may be fastened to chamber bottom 35 with glue, screws, or other such permanent fastening means known to those skilled in the art. In some such alternative embodiments, after adjusting rotatable ball and socket joint 23 to the desired position, ball 23 may be securely fixed within socket 32 to maintain both ball and socket joint 23 and the attached peripheral(s) in the intended position. As seen in FIG. 6, screws, including but not limited to chamber right screw 40 and chamber left screw 41 may be inserted into threaded holes (not shown) that pass entirely through, chamber top 34, to secure ball and socket joint 23. In such embodiments, chamber right screw 40 and chamber left screw 41 may be inserted into threaded holes (not shown) and tightened by an Allen wrench or other suitable tool, such that each screw applies friction to ball assembly 23, locking ball assembly 23 into place, and thereby preventing ball assembly 23, and the peripheral from shifting out of the desired position.

Figure 8:
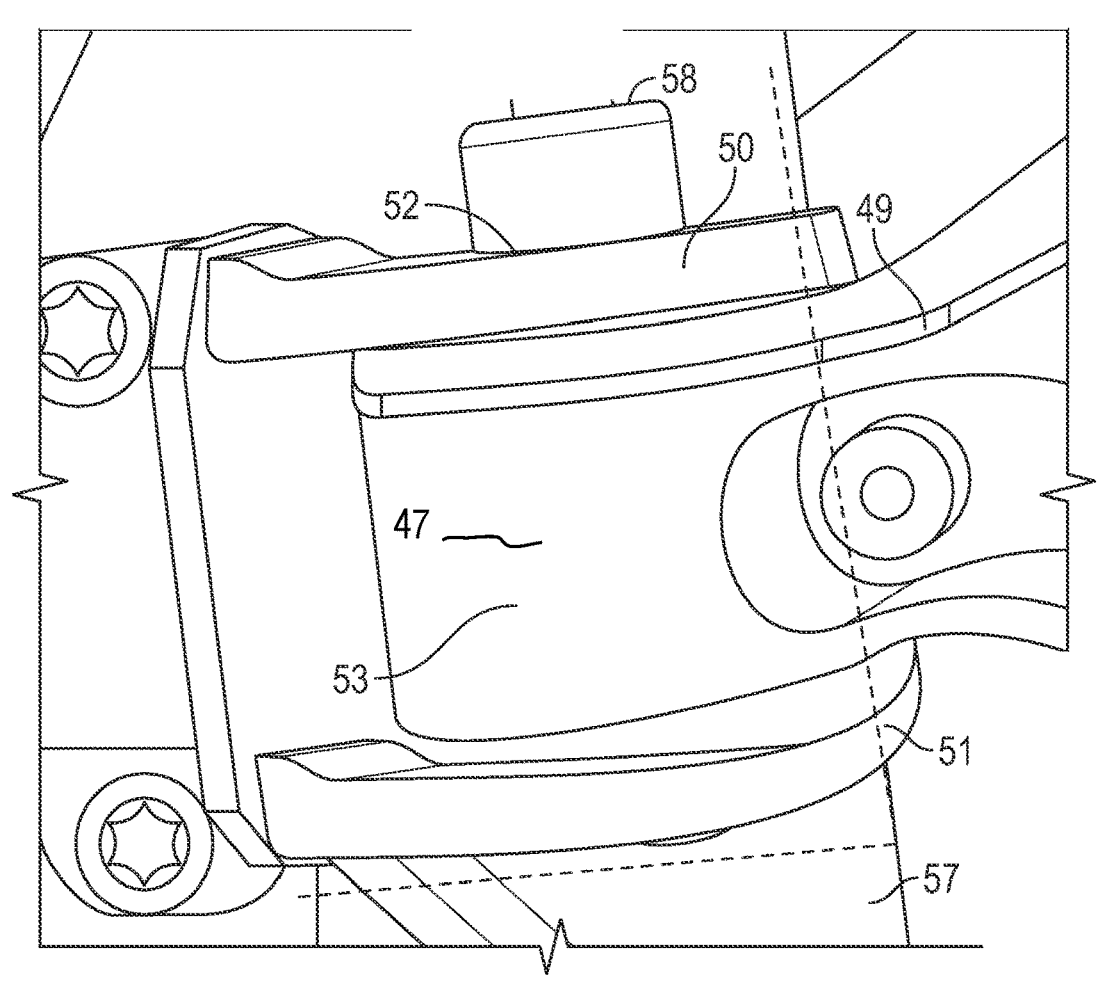
FIG. 8 is a zoomed-in view of the hinge.

In preferred embodiments, as seen in FIG. 1, the peripheral may couple to rotatable ball and socket joint 23 via hinge 47. In some embodiments, as seen in FIG. 1 and FIG. 7, the peripheral may be side-view mirror 48. Sideview mirror 48 may be coupled to ball assembly 23 via hinge 47, such that hinge 47 can be adjusted to further adjust sideview mirror 48's orientation. Other peripherals may be coupled to ball assembly via hinge 47 as well. As seen in FIG. 8, a hinge-based coupling mechanism enables side view mirror 48 to rotate along hinge's 47 longitudinal axis 49, allowing for an optimal view. In a preferred embodiment, before hinge 47 is adjusted, ball assembly 23 may first be adjusted, such that a peripheral, including but not limited to side view mirror 48, is in a suitable position. Once the peripheral is suitably adjusted, rotatable ball and socket joint 23 may be locked, preferably by tightening screws, including but not limited to chamber right screw 40 and chamber left screw 41. In some embodiments, Allen cap screws may be tightened with an Allen wrench or any other suitable means. After chamber right screw 40 and chamber left screw 41 are sufficiently tightened, the friction between the screws and spheroid 24 prevents rotatable ball and socket joint 23 from shifting or rotating to a different orientation. If minor adjustments, along the lateral axis, need to be made after rotatable ball and socket joint 23 is locked into position, the peripheral may be further adjusted via hinge 47. A further description of hinge 34 is detailed below.

As seen in FIG. 7, chamber 33 may be fixed to hinge 47 via hinge upper plate 50 and hinge upper plate 51. In some embodiments, hinge upper plate 50 and hinge upper plate 51 may be fixed to distal face 42 of chamber 33, such that hinge upper plate 50 and hinge upper plate 51 are parallel, or similarly lateral to one another. In a preferred embodiment, hinge upper plate 50 and hinge upper plate 51 intersect distal face 42 in a perpendicular orientation. In a preferred embodiment, hinge upper plate 50 may be fixed to upper segment 43 of chamber 33 distal face 42, while hinge upper plate 51 may be fixed to lower segment 44 of chamber 33 distal face 42.

As seen in FIG. 8, hinge 47 may be revolute joint 52, with revolute joint 52 including hinge upper plate 50, upper plate aperture (not shown), hinge lower plate 51, lower plate aperture (not shown), hinge pin 58, ring 53, and rotary bearing (not shown). In a preferred embodiment hinge upper plate 50 and hinge lower plate 51 lie on parallel planes, such that hinge pin 58 intersects both hinge upper plate 50 and hinge lower plate 51. A peripheral may be coupled to rotary bearing (not shown) via ring 53, such that the peripheral is set on the distal end of revolute joint 52, and such that when rotary bearing (not shown) rotates, the peripheral rotates correspondingly.

It is preferable that hinge 47 be fixed into position, such that the peripheral remains in the desired position when the chassis is in motion. Therefore, it is preferable that hinge pin 58 be a partially or fully threaded screw, and that rotary bearing (not shown) be partially threaded, with helical ridges (not shown) corresponding to those helical ridges on hinge pin 58, such that when hinge pin 58 is screwed into rotary bearing (not shown) the corresponding threads grip onto one another, locking rotary bearing (not shown) into place around hinge pin 58. When rotary bearing (not shown) is locked into position, relative to hinge pin 58, the peripheral, fixed to revolute joint 52, is immobile as well. To rotate revolute joint 52, hinge pin 58 must be loosened, such that hinge pin 58 is no longer screwed into rotary bearing (not shown), allowing rotary bearing (not shown) to pivot, or otherwise rotate, around hinge pin 58.

In an alternative embodiment, hinge pin 58 may be an Allen screw, secured by a single or plurality of nuts, without or without a washer (not shown) or plurality of washers (not shown), such that the nut (not shown) and washer (not shown) are set on the bottom of hinge pin 58. In such embodiments, when hinge pin 58 is fully tightened into the washer (not shown) and nut (not shown) the friction between hinge pin 58 and hinge upper plate 50, coupled with the friction between washer (not shown) and hinge lower plate (51) prevents revolute joint 52 from rotating. In such embodiments, rotary bearing (not shown) need not be threaded.

In some embodiments, ring 53 may be firmly coupled to the peripheral, including but not limited to side view mirror 48. In a preferred embodiment, ring 53 may be a component of side view mirror 48, such that ring 53 couples side view mirror 48 to revolute joint 52. It is preferable that ring 53 encase rotary bearing (not shown), and that rotary bearing (not shown) encircling hinge pin 58 in such a manner that when the peripheral needs to be adjusted laterally, hinge pin 58 remains stationary, with ring 53 and rotary bearing (not shown) pivoting around hinge pin 58. In some embodiments hinge pin 58 may pass through or be set within upper plate aperture (not shown) and lower plate aperture (not shown), with upper plate aperture (not shown) being carved within upper hinge plate 50 and lower plate aperture (not shown) being carved within lower hinge upper plate 51.

Versatility

Coupling a peripheral to chassis 8 using modular clamp system 10, ball and socket joint 22, and hinge 47, allows for precise vertical, horizontal, and diagonal peripheral adjustments. In certain configurations, the adjustment range may span approximately two hundred seventy degrees in the horizontal direction and three hundred sixty degrees in the vertical direction, when the peripheral is affixed to a chassis, including but not limited to an "A" or "A+" roll cage.

As disclosed above, and as seen in FIG. 2, FIG. 3, and FIG. 4 modular clamp system 10 includes multi-component clamp 11, fashioned from a partial tubular body 12, that may encircle approximately three-quarters of a chassis 8, and from wedged body 15, wedged body 15 being coupled to a peripheral, such that wedged body 15 integrates with partial tubular body 12 coupling the peripheral to chassis 8. Modular clamp system 10 provides various orientation options for coupling a peripheral to chassis 8, allowing for a single peripheral to couple with a variety of different frames 8. As seen in FIG. 4, partial tubular body 12 offers versatility in its placement along chassis sidebar 55, as first clamps section 12 may be set anywhere along chassis sidebar 8, providing flexible positioning of the peripheral. Chassis sidebar 8 may be rounded or edged. Additionally, wedged body 15 may be rotated, in some embodiments, one hundred eighty degrees, such that wedged body 15 may couple to partial tubular body 12 in either a rearward facing position (not shown) or a frontward facing position (not shown), As seen in FIG. 3, when wedged body 15 is installed in rearward-facing position (not shown) wedged body center 56 is facing toward the distal end of the chassis (not shown). Alternatively, when wedged body 15 is installed in a frontward-facing position, wedged body center 56 faces toward the proximal end of the chassis (not shown).

The orientation of wedged body 15 may be modulated depending on which other attachments are coupled to chassis 8. For example, when chassis 8 is a standard "A" pillar roll cage, having a standard windshield, the rearward facing position may be preferable for installing wedged body 15 around windshields. But when chassis 8 is an "A+" or "B" pillar roll cage, having a window net, the forward-facing position may be preferable for installing wedged body 15 around window nets.

As discussed above, once wedged body 15 is fixed to partial tubular body 12, the peripheral's orientation along a semi-spherical axis may be adjusted. Such a precise level of adjustability allows the peripheral to be aligned to match the requirements of the user as well as the surrounding environment, ensuring optimal functionality and adaptability.

As discussed above, ball and socket joint 22 may be adjusted by loosening chamber right screw 40 and chamber left screw 41, in some embodiments with a five-millimeter Allen key, such that chamber right screw 40 and chamber left screw 41 are not grasping onto socket 32, and therefore ball assembly 23 may move freely within socket 32. Once loosened, ball assembly 23 may be rotated along any axis or combination of axes until the peripheral is positioned in a desired placement, at which point screws, such as chamber right screw 40 and chamber left screw 41 may be tightened, such that screw chamber right screw 40 and chamber left screw 41 tighten socket 32 around ball assembly 23, fully restricting ball assembly's 23 movement, such that ball assembly 23, and as a result the peripheral are locked into place at the desired placement.

Once the peripheral is satisfactorily placed along a spherical axis, the peripheral's alignment along hinge lateral axis 57, as seen in FIG. 8, may be further adjusted by adjusting hinge 47. Hinge 47 may be adjusted laterally, rotating peripheral 35 around the hinge pin's 58 vertical axis. As seen in FIG. 8, hinge pin 58 may be a screw such that hinge 47 only moves when hinge pin 58 is loosened. In such embodiments, hinge pin 58 may be an Allen screw, such that revolute joint 52 may rotate when hinge pin 58 is loosened with an Allen key (not shown). Once the peripheral is suitably positioned, hinge pin 58 may be tightened, in some embodiments with an Allen key, such that revolute joint 52, and the peripheral, remain locked into place once the chassis is mobilized.

OTHER ACCESSORIES

Figure 9:
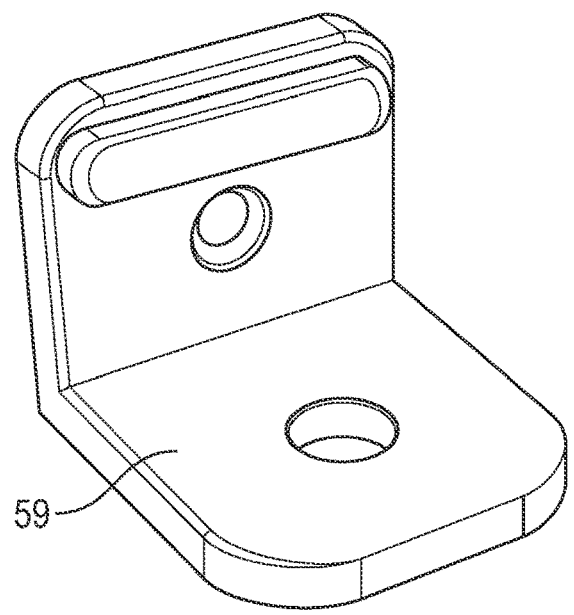
FIG. 9 is a view of the accessory mounting tab.
Figure 10:
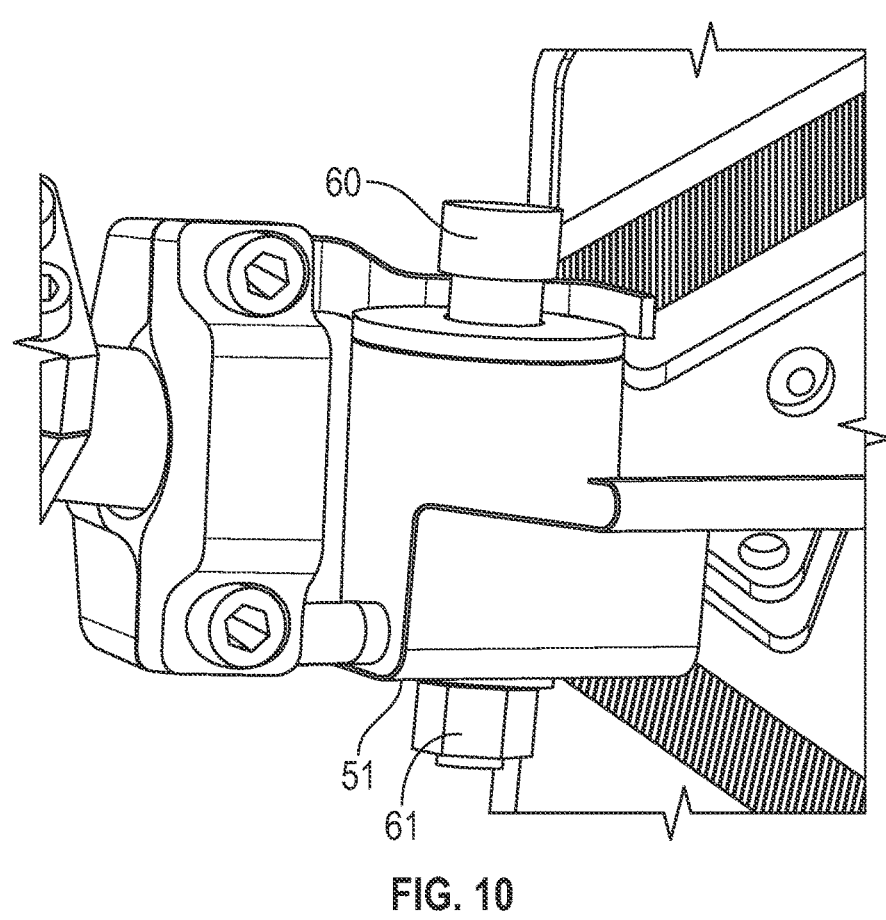
FIG. 10 is a view of the hinge set with the alternative extended accessory mounting screw.
Figure 11:
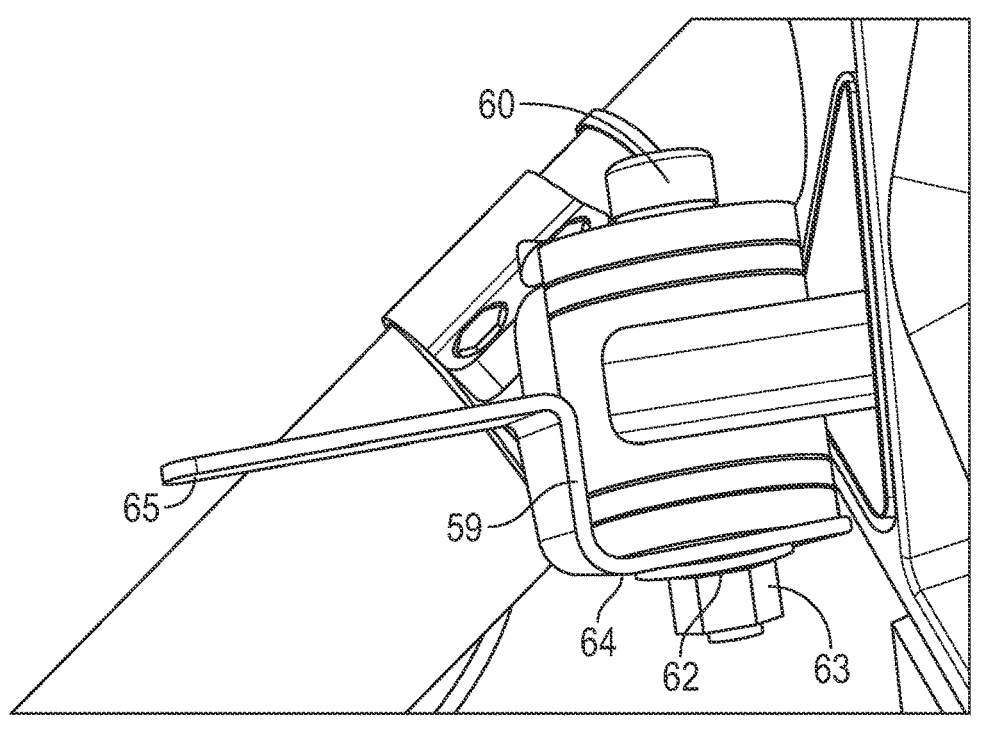
FIG. 11 is a view of the accessory mounting tab mounted to the hinge.

In a preferred embodiment, hinge 47 may be hefty, robust, and durable enough to support secondary accessories that may complement the peripheral. As seen in FIG. 9 and FIG. 10, in one embodiment, accessory mount 59 may be coupled to hinge 47 such that hinge 47 may support a secondary peripheral or accessory. In some embodiments, accessory mount 59 may be coupled to hinge 47 with extended accessory mounting screw 60. In such embodiments, hinge pin 58 may be removed from hinge 47, such that the rotary bearing (interior of 52, not shown) is hollow and vacant. As seen in FIG. 10, hinge pin 58 may be replaced with extended accessory mounting screw 60, such that extended accessory mounting screw distal end 61 is exposed through hinge lower plate 51. Accessory mount 59, as seen in FIG. 9 and FIG. 11, may be threaded onto accessory mount screw exposed end 61, and secured with accessory mount washer 62 and accessory mount nut 63. As seen in FIG. 11, accessory mount 59 is preferably mounted onto extended accessory mounting screw exposed end 61 such that accessory mount small end 64 lays flush against hinge lower plate 51 while accessory mount large end 65 is perpendicular to hinge 47. It is preferable that accessory mount 59 be fixed to hinge 47 such that accessory mount 59 may couple accessories weighing approximately sixteen ounces in weight to hinge 47. In alternative embodiments, heavier accessories may be mounted to accessory mount 59.

I claim:

1. A lockable peripheral mounting and adjustment system for use on a chassis sidebar comprising:

an adjustable multi-component clamp system comprising:
a hollow partial tubular body adapted to surround and/or circumscribe the chassis sidebar, said first hollow partial tubular body having opposing ends and an adjustable diameter;

said hollow partial tubular body coupled to a wedged body, wherein the partial tubular body and wedged body together fully circumscribe a portion of the chassis sidebar;

said wedged body coupled to a rotatable joint, wherein a ball coupled to said adjustable multi-component clamp system is located within a hollow socket of a chamber in said rotatable joint;

a pair of plates coupled to a distal end of said rotatable joint, with a top plate coupled to a top of a revolute joint and a bottom plate coupled to a bottom of said revolute joint, whereby the coupled plates couple to the revolute joint to allow one-degree-of-rotation between said revolute joint and said plates, a peripheral coupled to a distal end of said pair of plates whereby when said plates rotate, the peripheral rotates accordingly.

2. The lockable peripheral mounting and adjustment system of claim 1 wherein said adjustable multi-component clamp system, said rotatable joint, and said pivotable hinge each comprise a bolted locking mechanism.

3. The lockable peripheral mounting and adjustment system of claim 1, wherein said rotatable joint comprises a ball-and-socket joint wherein a spheroid serves as a ball for said ball-and-socket joint.

4. The lockable peripheral mounting and adjustment system of claim 1 wherein the partial tubular body conforms to a rounded and/or an edged chassis sidebar.

5. The lockable peripheral mounting and adjustment system of claim 1 wherein the hollow partial tubular body couples to the wedged body with one or more bolts.

6. The lockable peripheral mounting and adjustment system of claim 1 wherein the wedge body rotates along said ball of said rotatable ball-and-socket joint, independent of the peripheral.

7. The lockable peripheral mounting and adjustment system of claim 1 wherein the wedged body is fixed to a trapezoidal prism, whereby said trapezoidal prism fixes said wedged body to a neck, whereby said neck couples said trapezoidal prism to the spheroid.

8. The lockable peripheral mounting and adjustment system of claim 1 wherein said socket comprises a multi-part chamber, with said multi-part chamber compressing said spheroid to lock a relative position of said spheroid into a set position.

9. The lockable peripheral mounting and adjustment system of claim 1 wherein the chamber comprises a chamber top and a chamber bottom, with the chamber top and chamber bottom each partially encircling the spheroid, whereby the chamber top and chamber bottom join to one another to fully encircle the spheroid.

10. The lockable peripheral mounting and adjustment system of claim 9 wherein the chamber top and chamber bottom further comprise apertures, whereby a screw or plurality of screws may pass through the apertures to fix, and optionally tighten, the chamber top to chamber bottom, whereby chamber top and chamber bottom squeeze the spheroid, applying friction to said spheroid to lock said spheroid in position.

11. The lockable peripheral mounting and adjustment system of claim 8 wherein said rotatable ball-and-socket joint comprises at least one chamber screw set through one or more apertures in said chamber locking said spheroid into a fixed position.

12. The lockable peripheral mounting and adjustment system of claim 1 wherein said revolute joint comprises a hinge pin and rotary bearing such that said rotary bearing is fixedly coupled with said peripheral and said rotary bearing rotates around said hinge pin along a longitudinal axis of said hinge pin.

13. The lockable peripheral mounting and adjustment system of claim 12 wherein the hinge pin comprises a threaded cylindrical body wherein screwing said hinge pint into the rotary bearing locks a relative position of said peripheral relative to said ball-and-socket joint.

14. The lockable peripheral mounting and adjustment system of claim 12 wherein said hinge pin comprises an alternative extended accessory mounting screw to replace said hinge pin such that said extended accessory mounting screw comprises a distal end extending beyond a plate of said pair of plates.

15. The lockable peripheral mounting and adjustment system of claim 14 wherein said extended accessory mounting screw supports an accessory mounted thereon, said extended accessory mounting screw coupling said accessory to said lockable peripheral mounting and adjustment system.

16. The lockable peripheral mounting system of claim 1 wherein the peripheral is a side-view mirror.

17. The lockable peripheral mounting system of claim 15 wherein the accessory is a light fixture.

18. A method for fixing a peripheral to a chassis sidebar wherein the peripheral is coupled to a revolute joint, said revolute joint comprising a hinge pin and a rotary bearing, with the revolute joint coupled to a rotatable joint, the rotatable joint being fixed in position with at least one chamber screw, with the rotatable joint coupled to a multi-component clamp system said method comprising:

fixing the multi-component clamp system to the chassis sidebar by first coupling a hollow partial tubular body around at least a majority of the chassis sidebar;

rotating a wedged body until the wedge body properly fits around the chassis sidebar and any accessories optionally coupled to the chassis sidebar;

further fixing relative positions of the wedged body to the partial hollow tubular body;

loosening one or more chamber screws to provide movement in the ball-and-socket joint;

rotating said ball-and-socket joint until said peripheral is satisfactorily positioned in an axis parallel to the chassis sidebar;

tightening said plurality of chamber screws until said rotatable joint is fixed in position;

loosening the hinge pin such that the rotary bearing may pivot around a longitudinal axis of the hinge pin;

pivoting said revolute joint until said peripheral is properly positioned; and tightening the hinge pin until said peripheral is fixed in position.

19. The method as set forth in claim 18 further comprising the step of replacing the hinge pin with an extended accessory supporting screw, and further coupling an accessory to the accessory supporting screw.

* * * * *